(12) United States Patent
Higuchi

(10) Patent No.: US 7,478,553 B2
(45) Date of Patent: Jan. 20, 2009

(54) METHOD FOR DETECTING EXCESSIVE BURN

(75) Inventor: Kazuhiro Higuchi, Ichinomiya (JP)

(73) Assignee: Denso Corporation, Kariya (JP)

( * ) Notice: Subject to any disclaimer, the term of this patent is extended or adjusted under 35 U.S.C. 154(b) by 47 days.

(21) Appl. No.: 11/651,616

(22) Filed: Jan. 10, 2007

(65) Prior Publication Data
US 2007/0157610 A1    Jul. 12, 2007

(30) Foreign Application Priority Data
Jan. 10, 2006    (JP)    ............... 2006-002603

(51) Int. Cl.
   *G01M 15/00*    (2006.01)
(52) U.S. Cl. .................................. 73/114.73
(58) Field of Classification Search ............... 73/23.31, 73/23.32, 114.69, 114.71, 114.72, 114.73, 73/114.74, 114.75
See application file for complete search history.

(56) References Cited

U.S. PATENT DOCUMENTS

| | | | |
|---|---|---|---|
| 6,756,904 B2* | 6/2004 | Kinugawa et al. | ........... 340/606 |
| 6,842,690 B2* | 1/2005 | Akao et al. | ................. 701/114 |
| 6,901,747 B2* | 6/2005 | Tashiro et al. | ................. 60/286 |
| 6,922,639 B2* | 7/2005 | Kawase et al. | ................. 702/24 |
| 7,174,779 B1* | 2/2007 | Kwon | ...................... 73/114.75 |
| 7,188,512 B1* | 3/2007 | Wills | ......................... 73/23.31 |
| 7,281,369 B2* | 10/2007 | Emi et al. | ...................... 60/297 |
| 7,319,928 B2* | 1/2008 | Hodjati et al. | .............. 701/102 |
| 2003/0106303 A1 | 6/2003 | Plote | |
| 2005/0188681 A1 | 9/2005 | Emi et al. | |
| 2007/0044455 A1* | 3/2007 | Barasa et al. | ................. 60/295 |

FOREIGN PATENT DOCUMENTS

JP     2001-207830        8/2001

OTHER PUBLICATIONS

Office Action issued Jul. 17, 2008 in corresponding German Application No. 10 2007 000 001.6-26 and an at least partial translation thereof.
Office Action issued Sep. 26, 2008 in corresponding Chinese Application No. 200710001629.8 and an at least partial English language translation thereof.

* cited by examiner

*Primary Examiner*—Eric S McCall
(74) *Attorney, Agent, or Firm*—Nixon & Vanderhye P.C.

(57) ABSTRACT

In an excessive burn detection method for detecting an excessive burn during a regeneration process, in which particulates accumulated in a particulate filter arranged in an exhaust passage of a diesel engine are burned and removed for regenerating the particulate filter, an oxygen concentration in exhaust gas in the exhaust passage downstream of the particulate filter is measured in predetermined time intervals after the regeneration process starts and it is determined whether the excessive burn occurs by determining whether the measured oxygen concentration decreases with a predetermined tendency.

16 Claims, 6 Drawing Sheets

METHOD FOR DETECTING EXCESSIVE BURN

CROSS REFERENCE TO RELATED APPLICATION

This application is based on and incorporates herein by reference Japanese Patent Application No. 2006-2603 filed on Jan. 10, 2006.

BACKGROUND OF THE INVENTION

1. Field of the Invention

The present invention relates to a method for detecting excessive burn (excessive burning state) during a regeneration process of a particulate filter disposed at an exhaust passage of a diesel engine.

2. Description of Related Art

Exhaust gas of a diesel engine includes particulates, which are exhaust particles of mainly carbon. The particulates cause black smoke in the exhaust gas. Thus, there is provided an exhaust gas purifying apparatus, in which a honeycomb ceramic particulate filter is provided in an exhaust passage of the diesel engine to collect the particulates with the filter.

The filter of the exhaust gas purifying apparatus is clogged with the particulates attached thereto with the passing of time. As a result, pressure in the exhaust passage increases thereby degrading an engine output and a fuel economy.

Therefore, there is proposed a method for automatically sensing the clog of the filter to regenerate the filter by burning the collected particulates.

A method for providing a burning state (method for burning the particulates) includes, for example, providing an intake air throttle valve upstream of the engine. In this method, the intake air is reduced to increase exhaust gas temperature of the engine, thereby the particulates are burned. Also, another method for providing the burning state includes mixing the exhaust gas with unburned gases such that the hydrocarbon (HC) in the unburned gases reacts with an oxidation catalyst to increase the exhaust gas temperature. Thus, the particulates are burned. (see Japanese Unexamined Patent Publication No. 2001-207830).

When the collected particulates are burned and removed, the temperature in the filter increases due to the burning. At this time, the filter may be melted and damaged when, for example, the particulates are partially accumulated in the filter to cause excessive burn. Therefore, to limit the filter from breaking due to the excessive burn, there has been utilized a method for determining whether excessive burn (excessive burning state) occurs by monitoring the exhaust gas temperature downstream of the filter.

However, the temperature features in having a relatively large time constant so that there is a delay before the exhaust gas temperature notifies a change of the burning state of the particulates. In other words, even when the excessive burn occurs due to the regeneration process, it may take a certain amount of time before the change of the exhaust gas temperature is detected. Thus, the regeneration process may be excessively continued for more than a necessary period and a risk for melting and damaging the filter due to the excessive burn may be enhanced.

SUMMARY OF THE INVENTION

The present invention is made in view of the above disadvantages. Thus, it is an objective of the present invention to address at least one of the above disadvantages.

To achieve the objective of the present invention, there is provided an excessive burn detection method for detecting an excessive burn during a regeneration process, in which particulates accumulated in a particulate filter arranged in an exhaust passage of a diesel engine are burned and removed for regenerating the particulate filter. According to the method, an oxygen concentration in exhaust gas in the exhaust passage downstream of the particulate filter is measured in predetermined time intervals after the regeneration process starts. It is determined whether the excessive burn occurs by determining whether the oxygen concentration, which is measured by the measuring of the oxygen concentration, decreases with a predetermined tendency.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

First Embodiment

A method for detecting excessive burn (excessive burning state) during a regeneration process of a particulate filter of an embodiment of the present invention will be described with reference to FIGS. 1 to 6.

Figure 1:
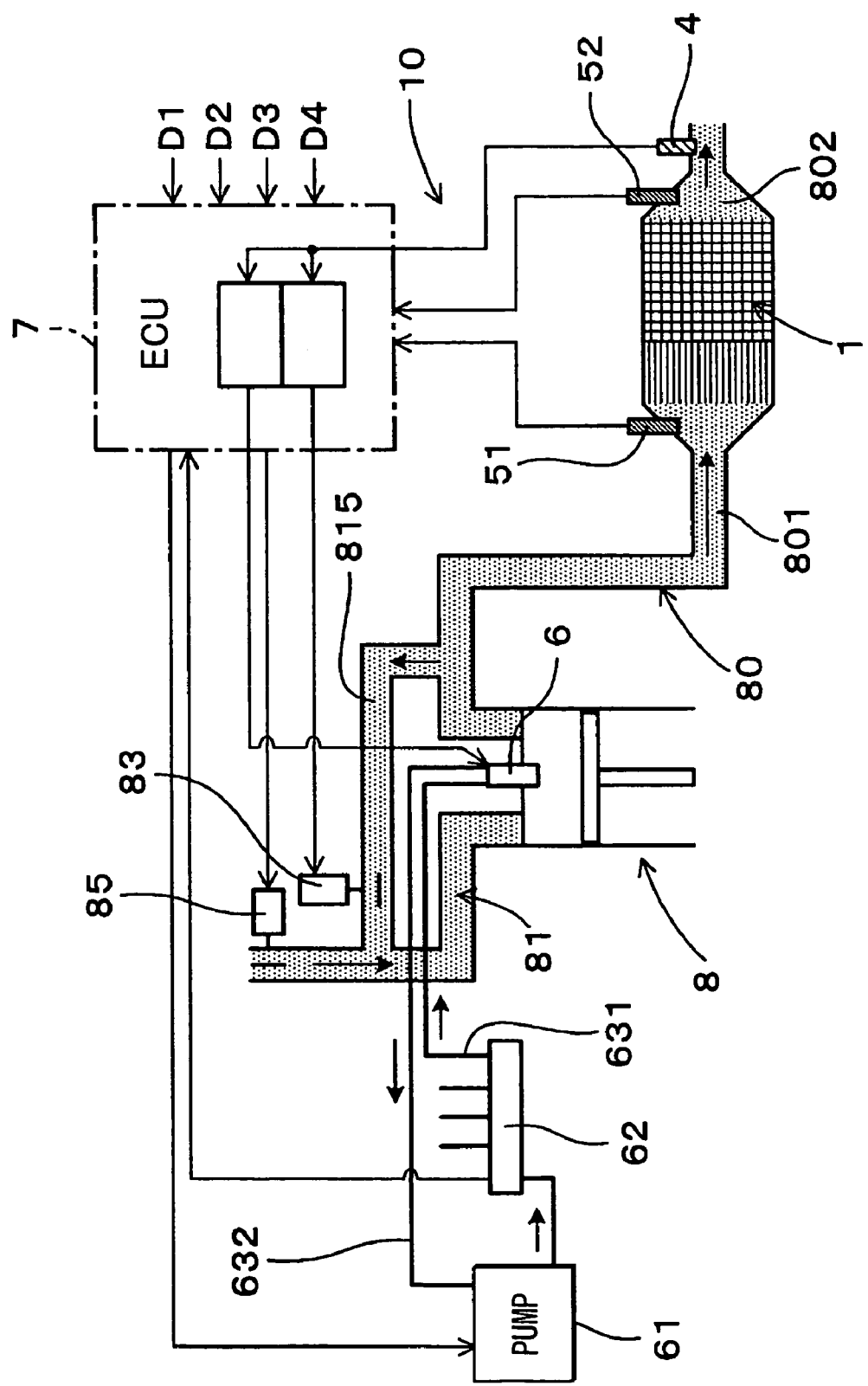
FIG. 1 is a schematic view of an exhaust gas purifying apparatus of a first embodiment of the present invention.

In the present detection method for detecting the excessive burn during the regeneration process of the particulate filter, the detection method detects the excessive burning state during the regeneration process, where particulates, which are accumulated (collected) in a particulate filter 1 arranged in an exhaust passage 80 of a diesel engine 8, are burned and removed as shown in FIG. 1.

The above detection method includes a measuring step for measuring oxygen concentration and a determining step for determining the excessive burn. In the measuring step, oxygen concentrations of exhaust gas in the exhaust passage 80 downstream of the particulate filter I is measured in predetermined intervals after the regeneration process starts.

The exhaust gas purifying apparatus 10 of the present embodiment includes an engine control unit (ECU) 7 and the particulate filter 1 provided in the exhaust passage 80 of the diesel engine 8 as above. The regeneration process of the particulate filter 1 is performed using a function of the ECU 7. The ECU 7 is designed to receive various operational data D1 to D4 as shown in FIG. 1, such as an output from a boost pressure sensor (not shown), an output from an intake air flow sensor (not shown), an engine rotational speed, and a vehicle speed, to perform various controls.

A bypass passage 815 is provided between an intake passage 81 and the exhaust passage 80 of the diesel engine for connecting therebetween, and the bypass passage 815 is equipped with an exhaust gas recirculation (EGR) valve 83 for recirculation of the exhaust gas. Also, the intake passage 81 is provided with an intake valve 85. The EGR valve 83 and the intake valve 85 are both designed to be controlled by the ECU 7.

Also, the diesel engine 8 has an injector 6 which is connected with, for example, a pump 61 and a common rail 62 through fuel passages 631, 632. Here, the pump 61 and the common rail 62 are also controlled by the ECU 7.

Also, an exhaust gas temperature sensor 51 is provided in an exhaust passage 801 located upstream of the particulate filter 1 to measure temperature of the exhaust gas. Also, another exhaust gas temperature sensor 52 is provided in an exhaust passage 802 located downstream of the particulate filter 1 also to measure the temperature of the exhaust gas. An air fuel ratio (A/F) sensor 4 is provided in the exhaust passage 802 downstream of the particulate filter 1 to detect the oxygen concentration of the exhaust gas. Then, the detection values detected by the exhaust gas temperature sensors 51, 52 and the A/F sensor are transmitted to the ECU 7 in this structure.

The A/F sensor 4 is a layered A/F sensor, which is originally intended to compute an air fuel ratio (A/F value) such that the ECU 7 performs a control for improving an exhaust gas property based on the A/F value. In the present embodiment, the A/F sensor is used for detecting the oxygen concentrations in the method for detecting the excessive burn during the regeneration process of the particulate filter. Also, the A/F sensor can detect the oxygen concentration in the air fuel mixture of any air fuel ratio (not limiting to the oxygen concentration in the air fuel mixture of a what-is-called stoichiometric state). Thus, the detecting accuracy can be further improved.

Figure 2:
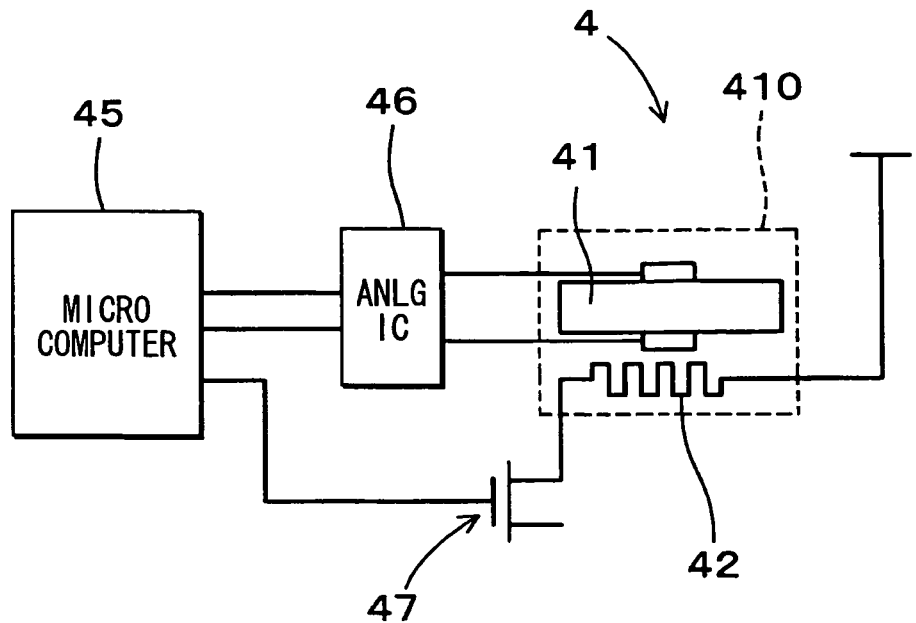
FIG. 2 is a schematic diagram of an air fuel ratio sensor of the first embodiment.

A schematic diagram of the A/F sensor is shown in FIG. 2. The A/F sensor is substantially activated at about 770° C. and outputs the A/F value of a better degree of accuracy. Thus, it is important to raise the temperature of a sensor element 41 of the A/F sensor 4 to keep the temperature around 770° C. In order to achieve this, the A/F sensor 4 includes a heater 42 in a sensor unit 410. Thus, due to heat generation of the heater 42, the temperature of the sensor element 41 can be raised and kept at a predetermined temperature. Also, the A/F sensor 4 is controlled by a microcomputer 45, which performs a computation process, and an analog IC 46, and a heater control pulse width modulation (PWM) 47.

Figure 3:
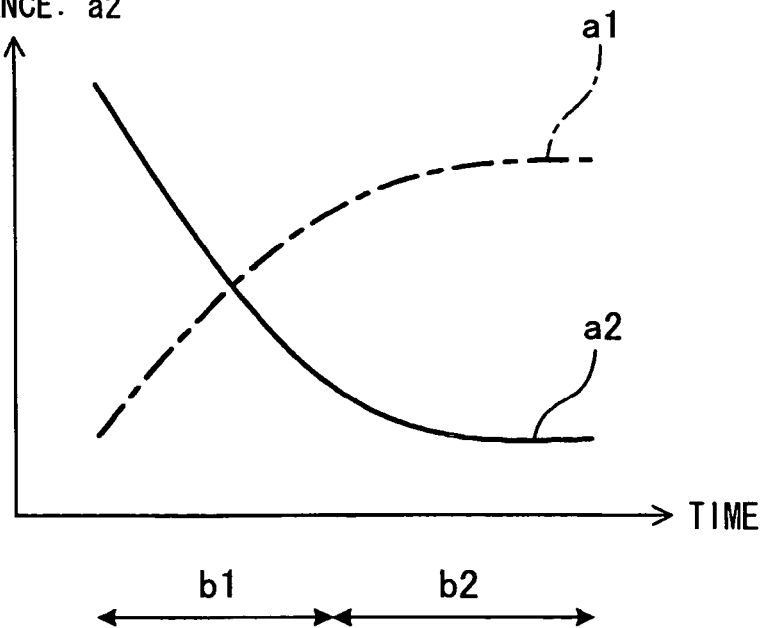
FIG. 3 is a chart showing a characteristic of the air fuel ratio sensor of the first embodiment.

FIG. 3 shows a relation between temperature a1 and impedance a2 of the sensor element 41 of the A/F sensor 4. A horizontal axis of FIG. 3 indicates time, and a vertical axis indicates the temperature and the impedance.

As shown in FIG. 3, the temperature a1 and the impedance a2 of the sensor element 41 correspond with each other (e.g., one-to-one correspondence). Thus, the temperature a1 of the sensor element 41 can be controlled by computing and controlling the impedance a2. Also, the sensor element 41 is designed to perform highly accurately output in a feedback control region b2, which exceeds a temperature rise region b1.

Figure 4:
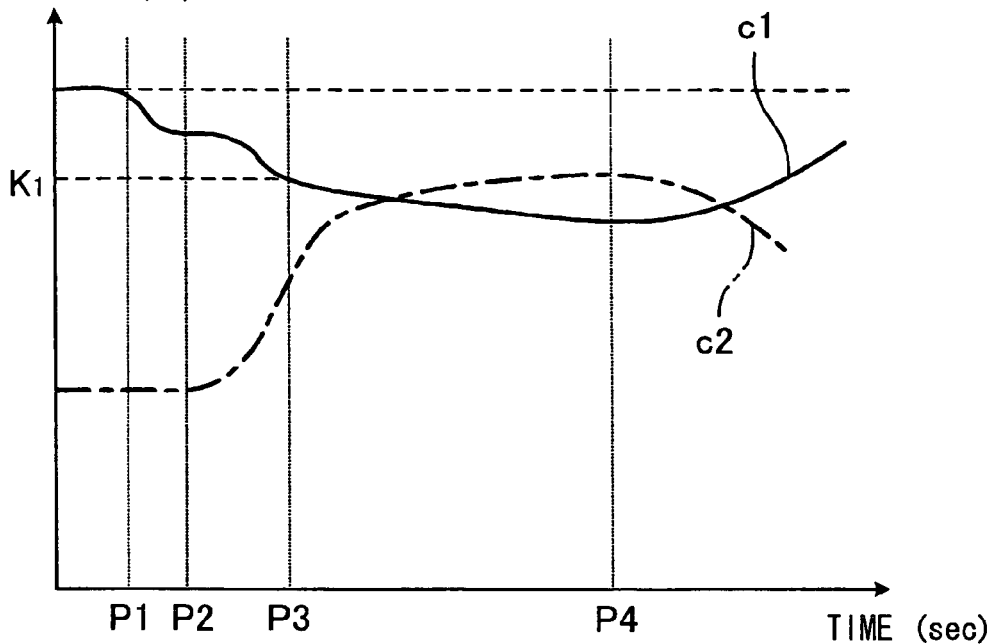
FIG. 4 is a chart showing a trend of an oxygen concentration in each event during a normal regeneration process of the first embodiment.

FIG. 4 is a conceptual drawing of the change of the oxygen concentration and the temperature of the exhaust gas downstream of the particulate filter 1 in a normal condition, where the particulate filter 1 is regenerated normally. In FIG. 4, a horizontal axis indicates time (sec), and a vertical axis indicates the oxygen concentration (%) and the exhaust gas temperature (° C.) downstream of the particulate filter 1. The oxygen concentration is plotted as a line c1 and the exhaust gas temperature is plotted as a line c2. Each of points P1 to P4 indicates a timing, at which each event changes.

An interval between a point P1 and a point P2 indicates an interval, in which a post injection is performed to prepare for the regeneration process. Here, in the post injection, unburned gas is admitted to an exhaust gas system. Thus, the regeneration process can be reliably started.

An interval between the point P2 and a point P3 indicates an interval, in which a catalyst carried inside the particulate filter 1 is activated.

An interval between the point P3 and a point P4 indicates an interval, in which the particulates accumulated in the particulate filter 1 are burned due to the catalytic activity so that the filter 1 is regenerated.

The excessive burn occurs, for example, only in this interval between the point P3 and the point P4. In this case, the oxygen concentration rapidly decreases.

The change of the oxygen concentration changes due to different causes in different intervals. For example, in the interval between the points P1 and P2, the concentration changes with the change of amount of the admitted unburned gas due to the above post injection. In the interval between the points P2 and P3, the concentration changes due to a reaction between the oxidation catalyst in the particulate filter 1 and hydrocarbon (HC) of the unburned gas. In the interval between the P3 and P4, the concentration changes due to the burning of the particulates. Change rates of the oxygen concentration in these intervals for each diesel engine can be empirically computed. In the normal condition, where the particulates are normally burned, it is possible to know which event (interval) it is based on a change curve of the empirical oxygen concentration and an actual change of the oxygen concentration.

Figure 5:
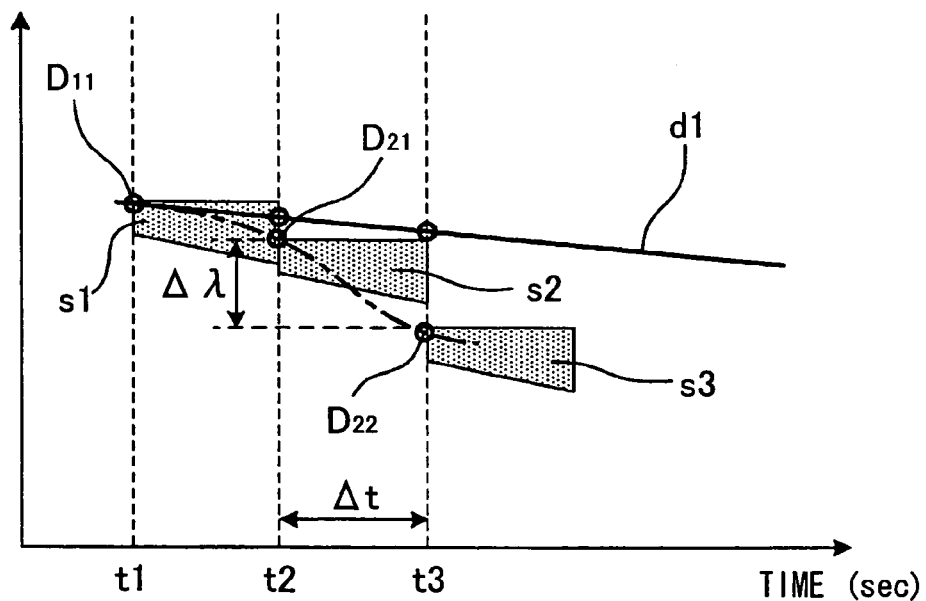
FIG. 5 is a chart showing a method for determining a tendency in decrease of the oxygen concentration of the first embodiment.

FIG. 5 shows a chart explaining a method for detecting the excessive burning state (excessive burn determining step) based on the change rate of the oxygen concentration while the particulates are burned.

Firstly, an oxygen concentration measuring step is performed to measure the oxygen concentration in the exhaust gas downstream of the particulate filter 1 at predetermined intervals Δt by using the above A/F sensor. The determining step for determining the excessive burn based on the measured oxygen concentration will be described as one embodiment. For example, in FIG. 5, the oxygen concentration is expected to change from a previously measured value D1, to an expected value on a change curve d1. Also, an allowable change range of the oxygen concentration changed from the measured value $D_{11}$ is shown by an allowable range s1. When a following measured value $D_{21}$ ranges within the above allowable range s1, it is determined that the oxygen concentration decreases with an appropriate (predetermined) tendency within assumed range. However, when the measured value $D_{22}$ deviates a corresponding allowable range s2, it is determined that the oxygen concentration decreases with an abnormal tendency, which is out of assumed range. Even in this case, if a further following measured value ranges within a corresponding allowable range s3, it is determined that the oxygen concentration decreases with the appropriate tendency. Then, the number of cases, where the oxygen concentration decreases with the abnormal tendency ranging out of the above allowable range, is counted. When the number of cases exceeds a predetermined number (predetermined frequency), it is determined that the excessive burning state occurs.

Figure 6:
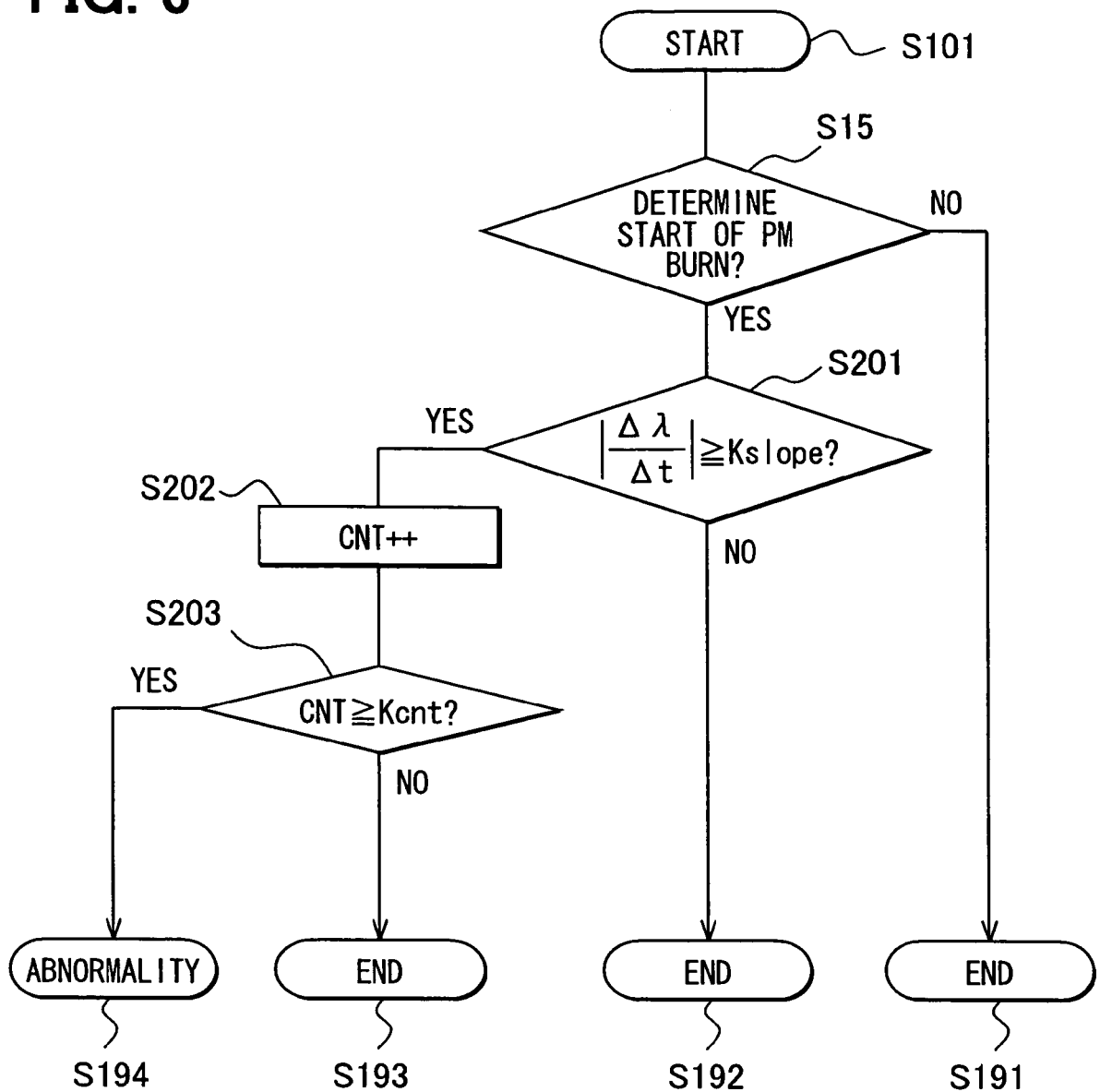
FIG. 6 is a flowchart showing a determining procedure for determining excessive burn of the first embodiment.

Here, in order to limit an erroneous determination, it is preferable that the determining process shown in FIG. 5 may be operated only in a period between the points P3 and P4 in FIG. 4, where the particulates are burned. Thus, in the present embodiment, before the above excessive burn determining step is operated, another determining step S15 for determining a start of the particulate (PM) burn is operated as shown in FIG. 6.

The determining step S15 for the start of the PM burn, for example, includes the following methods. In one example method, the start of the PM burn is determined based on an elapsed time from the point P1, at which the regeneration process starts. Also, in another example method, after the regeneration process starts, the start of the PM burn is determined based on whether the oxygen concentration measured in the above oxygen concentration measuring step is less than a predetermined reference concentration after the regeneration process starts. Here, the predetermined reference concentration corresponds, for example, a value around $K_1$ in FIG. 4.

The oxygen concentration in the exhaust gas downstream of the particulate filter 1 is likely to decrease to be less than that prior to the start of the regeneration process for a predetermined time immediately after the start, even though the excessive burn does not occur. Thus, by performing the excessive burn determining step only after the regeneration process operates in a normal burning state, more accurate determination can be achieved.

The normal burning state may be determined based not only on the time but also on the oxygen concentration. By either way, the more accurate determination can be achieved.

FIG. 6 shows a flowchart of major steps of the excessive burn determining method of the present embodiment. As shown in FIG. 6, after the oxygen concentration measuring step (not shown) is operated, control begins with step S101, which is a starting point. Then, the determining step S15 for determining the start of the PM burn is operated. In this determining step S15, when it is determined that the PM burn has not started, control continues with end step S191 for ending the process. When it is determined that the PM burn has started, the change rate of the measure oxygen concentration (change rate from a previously measured value to a currently measured value of the oxygen concentration) is computed as an oxygen concentration change rate $|\Delta\lambda/\Delta t|$ at step S201, which is a sub determining step. At step S201, it is also determined whether the computed oxygen concentration change rate $|\Delta\lambda/\Delta t|$ is equal to or larger than a decrease reference value Kslope.

When it is determined at step S201 that the oxygen concentration change rate $|\Delta\lambda/\Delta t|$ is less than the decrease reference value Kslope, control continues with an end step S192 for ending the process. In contrast, when it is determined that the oxygen concentration change rate $|\Delta\lambda/\Delta t|$ is equal to or larger than the decrease reference value Kslope, control continues with a counting step S202, where one is added to an abnormal decrease count CNT stored in a counter (counting device).

Next, control continues with a count determining step S203, where it is determined whether the abnormal decrease count CNT is equal to or larger than a reference count Kcnt. When it is determined at step S203 that the abnormal decrease count CNT is less than the reference count Kcnt, control continues with an end step S193 for ending the process. In contrast, when it is determined that the abnormal decrease count CNT is equal to or larger than the reference count Kcnt, control continues with an abnormality recognizing step S194, at which the excessive burning state is recognized. Then, control continues with a necessary step.

Thus, in the present embodiment, all steps from the sub determining step S201 to the abnormality recognizing step S194 correspond to the above excessive burn determining step.

In one embodiment, when the oxygen concentration change rate $|\Delta\lambda/\Delta t|$ is successively determined to be equal to or larger than the decrease reference value Kslope more often than the predetermined frequency (when the oxygen concentration is successively determined to decrease at the oxygen concentration change rate $|\Delta\lambda/\Delta t|$, which is equal to or lager than a decrease reference value Kslope, more often than a predetermined frequency Kcnt), it is determined that the excessive burn occurs. In this way, accurate determination without an erroneous measurement may be achieved.

Likewise, in the method for detecting the excessive burn of the present embodiment, the above excessive burn determining step is operated after the oxygen concentration measuring step is operated. Here, the oxygen concentration directly reflects the burning state of the particulates during the regeneration process. Thus, by determining the tendency of the decrease of the oxygen concentration, it is possible to determine whether the excess burn occurs or not. Therefore, it is possible to earlier and more accurately determine the excessive burning state compared with a conventional case where the excessive burning state is determined based on the exhaust gas temperature.

Thus, using this method for detecting the excessive burn can improve the performance and durability of the exhaust gas purifying apparatus of the diesel engine and can limit the fuel economy during the regeneration process from decreasing.

In the present embodiment, the predetermined tendency of the decrease of the oxidation concentration not only indicates that the oxidation concentration decreases, but also indicates (reflects) a transitional state to the excessive burning state. This predetermined tendency can be empirically computed by studying behavior of the oxygen concentration in the excessive burning state. Determining method for determining the tendency of the decrease is not limited to the above described method, but alternative methods may be applied.

In the present embodiment, the oxygen concentration change rate is used for determining the tendency of the decrease of the oxygen concentration. Therefore, determining reference value can be simplified.

In the present embodiment, a change $\Delta\lambda$ from a previously measured value to a currently measured value of the oxygen concentration is divided by a measuring interval $\Delta t$ to compute the oxygen concentration change rate $|\Delta\lambda/\Delta t|$. Here, $\Delta\lambda$ and Δt are shown in FIG. 5. However, the change rate may be expressed by only Δλ, and may be expressed by alternative similar ways.

Second Embodiment

Figure 7:
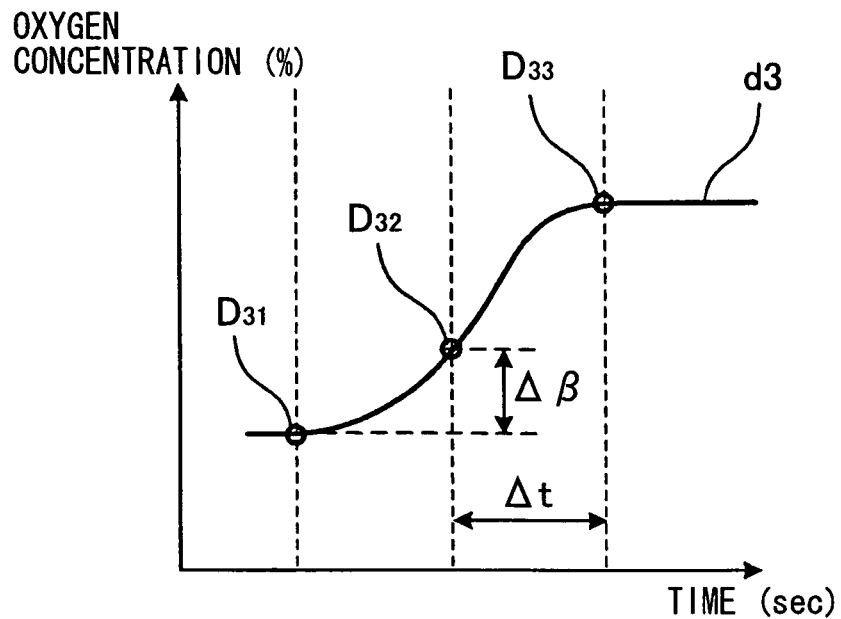
FIG. 7 is a chart showing a method for determining an end of the regeneration process of a second embodiment of the present invention.

The second embodiment will be described with reference to FIGS. 7 and 8. Similar components and steps of the second embodiment similar to those of the first embodiment will be indicated by the same numerals. In the present embodiment, the above excessive burn determining step is also operated. In addition to the excessive burn determining step, another determining procedure (regeneration end determining procedure) for determining an end of the regeneration without the excessive burn is operated. In this case, in the excessive burn determining step, it is determined that the regeneration process ends in a condition where the excessive burning state does not occur. In one embodiment, the regeneration end determining procedure is operated after end steps S192, S193, where it is determined that the excessive burn does not occur.

Figure 8:
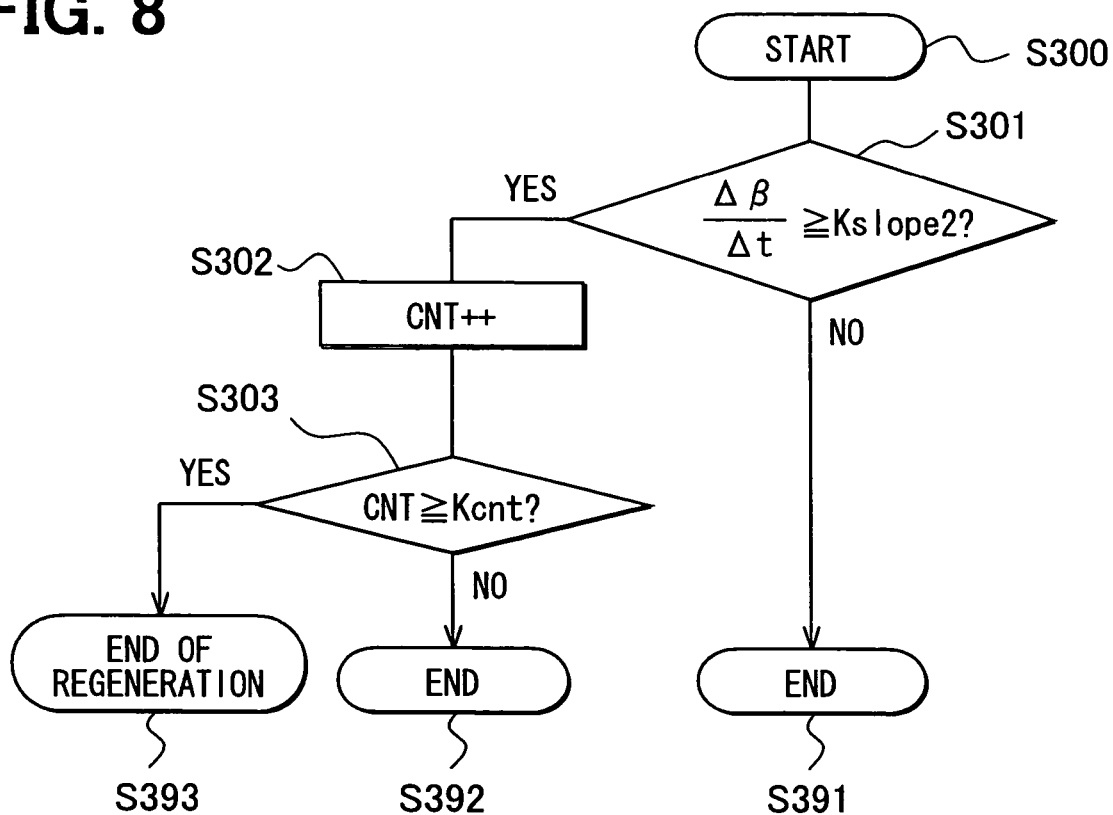
FIG. 8 is a flowchart showing a determining procedure for determining the end of the regeneration process of the second embodiment.

Control of the regeneration end determining procedure of the present embodiment begins with start step S300 as shown in FIG 8. A change curve d3 is based on measured oxygen concentrations values (e.g., $D_{31}$ to $D_{33}$) measured in the oxygen concentration measuring step. A change amount Δβ is computed as a change from a previously measured value $D_{31}$ to a currently measured value $D_{32}$. Also, a change rate Δβ/Δt is computed as a change rate per unit time as shown in FIG 7. Here, Δβ and Δt are shown in FIG 7.

As shown in FIG. 8, in a sub determining step S301, it is determined whether Δβ/Δt is equal to or larger than an increase reference value Kslope2. In this determination, when Δβ/Δt is less than the increase reference value Kslope2, control continues with end step S391 for ending the process. When it is determined that the Δβ/Δt is equal to or larger than the increase reference value Kslope2, control continues with counting step S302, at which one is added to an increase count CNT stored in the counter (counting device).

Next, control continues with a count determining step S303, where it is determined whether the stored increase count CNT is equal to or larger than a reference count Kcnt. When it is determined that the increase count CNT is less than the reference count Kcnt at the cont determining step S303, control continues with end step S392 for ending the process. In contrast, when it is determined that the increase count CNT is equal to or larger than the reference count Kcnt, control continues with a recognizing step S393 for recognizing an end of the regeneration process. Then, control continues with a necessary step.

In the present embodiment, as above, all the steps from the sub determining step S301 to the recognizing step S393 correspond to the above determining step S3.

In the present embodiment, it may be determined that the regeneration of the particulate filter 1 ends without the excessive burn when the change rate Δβ/Δt is successively determined to be equal to or larger than the increase reference value Kslope2 more often than a predetermined frequency (when the oxygen concentration is successively determined to increase at the oxygen concentration change rate Δβ/Δt, which is equal to or larger than an increase reference value Kslope2, more often than a predetermined frequency Kcnt).

In one embodiment, the above increase reference value Kslope2 and the predetermined frequency, which indicate a condition of the end of the regeneration without the excessive burn, may be empirically computed.

In the present embodiment, it is possible to more timely determine a case where the regeneration process normally ends without the excessive burn. Thus, the regeneration process can be more accurately operated.

Third Embodiment

Figure 9:
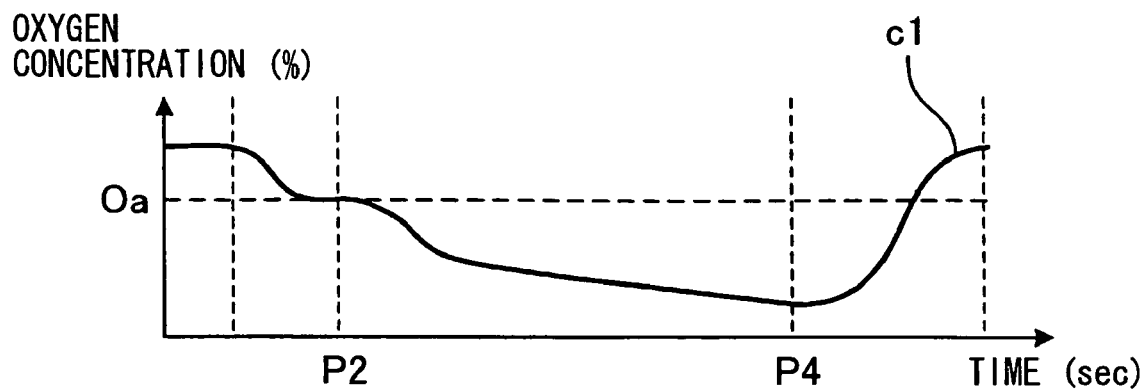
FIG. 9 is a chart showing a method for determining the end of the regeneration process of a third embodiment of the present invention.

The third embodiment will be described with reference to FIGS. 9 and 10. Similar components and steps of the third embodiment similar to those of the above embodiments will be indicated by the same numerals. In the present embodiment, the regeneration end determining procedure of the second embodiment is modified. Another determining procedure (regeneration end determining procedure) for determining the end of the regeneration of the present embodiment uses the change curve cI shown in FIG. 9, which indicates a change of the oxygen concentration when the regeneration process is normally operated. An oxygen concentration Oa at point P2, at which the post injection ends, serves as a reference value. When an oxygen concentration Ob, which is measured after the post injection, becomes equal to or larger than the reference oxygen concentration Oa again, it is determined that the regeneration process ends.

Figure 10:
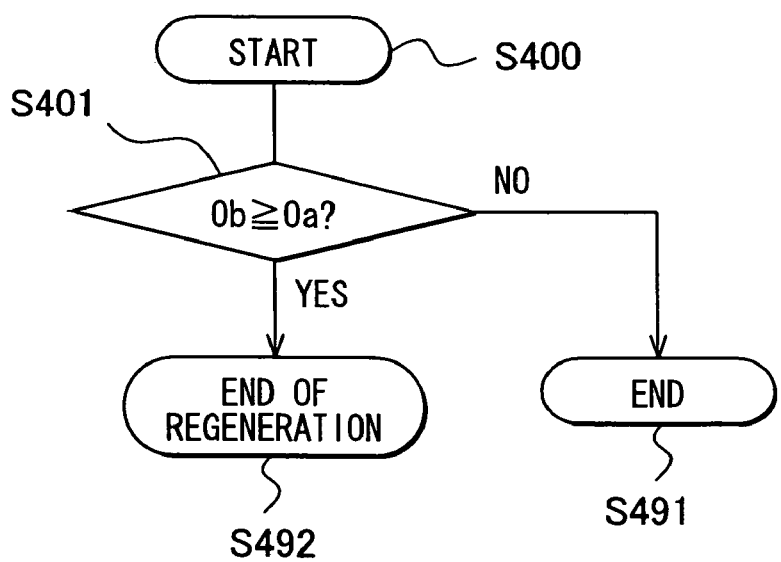
FIG. 10 is a flowchart showing a determining procedure for determining the end of the regeneration process of the third embodiment.

In other words, as shown in FIG 10, the regeneration end determining procedure of the present embodiment begins with start step S400. At determining step S401, it is determined whether the current oxygen concentration Gb is equal to or larger that the above reference oxygen concentration Ga. When it is determined that the oxygen concentration Gb is less than the above reference oxygen concentration Ga, control continues with end step S491 for ending the process. In contrast, when it is determined that the oxygen concentration Gb is equal to or larger than the above reference oxygen concentration Ga, control continues with a recognizing step S492 for recognizing the end of the regeneration. Then, control continues with a necessary step.

In the present embodiment, it is also possible to more timely determine the case where the regeneration process normally ends without the excessive burn. Thus, the regeneration process can be more accurately operated.

Additional advantages and modifications will readily occur to those skilled in the art. The invention in its broader terms is therefore not limited to the specific details, representative apparatus, and illustrative examples shown and described.

What is claimed is:

1. An excessive burn detection method for detecting an excessive burn during a regeneration process, in which particulates accumulated in a particulate filter arranged in an exhaust passage of a diesel engine are burned and removed for regenerating the particulate filter, the method comprising:

measuring an oxygen concentration in exhaust gas in the exhaust passage downstream of the particulate filter in predetermined time intervals after the regeneration process starts; and determining whether the excessive burn occurs by determining whether the oxygen concentration, which is measured by the measuring of the oxygen concentration, decreases with a predetermined tendency wherein: the determining of whether the oxygen concentration decreases with the predetermined tendency includes:

computing an oxygen concentration change rate, which is a change rate from a previously measured value to a currently measured value of the oxygen concentration measured by the measuring of the oxygen concentration; and determining whether the oxygen concentration decreases with the predetermined tendency based on the oxygen concentration change rate.

2. The method according to claim 1, wherein:
the determining of whether the excessive burn occurs includes determining that the excessive burn occurs when the oxygen concentration is successively determined to decrease at the oxygen concentration change rate, which is equal to or lager than a decrease reference value, more often than a predetermined frequency.

3. The method according to claim 1, further comprising:
determining that the regeneration process ends without the excessive burn when the followings are satisfied:
the determining of whether the excessive burn occurs determines that the excessive burn does not occur; and
the oxygen concentration is successively determined to increase at the oxygen concentration change rate, which is equal to or larger than an increase reference value, more often than a predetermined frequency.

4. The method according to claim 1, wherein:
the determining of whether the excessive burn occurs includes determining whether the excessive burn occurs after a predetermined time elapses since a time, at which the regeneration process starts.

5. The method according to claim 1, wherein:
the determining of whether the excessive burn occurs includes determining whether the excessive burn occurs after the oxygen concentration, which is measured by the measuring of the oxygen concentration, becomes less than a predetermined reference concentration after the regeneration process starts.

6. The method according to claim 1, wherein:
the measuring of the oxygen concentration includes measuring the oxygen concentration based on a sensing value sensed by an air fuel ratio sensor mounted at the exhaust passage for sensing an air-fuel ratio.

7. An excessive burn detection method for detecting an excessive burn during a regeneration process, in which particulates accumulated in a particulate filter arranged in an exhaust passage of a diesel engine are burned and removed for regenerating the particulate filter, the method comprising:
measuring an oxygen concentration in exhaust gas in the exhaust passage downstream of the particulate filter in predetermined time intervals after the regeneration process starts: and
determining whether the excessive burn occurs by determining whether the oxygen concentration, which is measured by the measuring of the oxygen concentration, decreases with a predetermined tendency:
wherein the regeneration process is started by performing a post injection of unburned gas into the exhaust passage.

8. The method according to claim 7, further comprising:
determining that the regeneration process ends without the excessive burn when the followings are satisfied:
the determining of whether the excessive burn occurs determines that the excessive burn does not occur; and
the oxygen concentration measured by the measuring of the oxygen concentration is more than an oxygen concentration of a time, where the post injection is performed.

9. An apparatus for detecting an excessive burn during a regeneration process, in which particulates accumulated in a particulate filter arranged in an exhaust passage of a diesel engine are burned and removed for regenerating the particulate filter, the apparatus comprising:

a sensor that measures an oxygen concentration in exhaust gas in the exhaust passage downstream of the particulate filter in predetermined time intervals after the regeneration process starts; and
a controller that determines whether the excessive burn occurs by determining whether the oxygen concentration measured by the sensor decreases with a predetermined tendency, wherein the controller determines whether the oxygen concentration decreases with the predetermined tendency by:
computing an oxygen concentration change rate, which is a change rate from a previously measured value to a currently measured value of the oxygen concentration measured by the sensor; and
determining whether the oxygen concentration decreases with the predetermined tendency based on the oxygen concentration change rate.

10. The apparatus according to claim 9, wherein:
the controller determines whether the excessive burn occurs by determining that the excessive burn occurs when the oxygen concentration is successively determined to decrease at the oxygen concentration change rate, which is equal to or lager than a decrease reference value, more often than a predetermined frequency.

11. The apparatus according to claim 9, wherein the controller performs:
determining that the regeneration process ends without the excessive burn when the followings are satisfied:
the determining of whether the excessive burn occurs determines that the excessive burn does not occur; and
the oxygen concentration is successively determined to increase at the oxygen concentration change rate, which is equal to or larger than an increase reference value, more often than a predetermined frequency.

12. The apparatus according to claim 9, wherein:
the determining, by the controller, of whether the excessive burn occurs includes determining whether the excessive burn occurs after a predetermined time elapses since a time, at which the regeneration process starts.

13. The apparatus according to claim 9, wherein:
the determining, by the controller, of whether the excessive burn occurs includes determining whether the excessive burn occurs after the oxygen concentration, which is measured by the measuring of the oxygen concentration, becomes less than a predetermined reference concentration after the regeneration process starts.

14. The apparatus according to claim 9, wherein:
the sensor comprises an air fuel ratio sensor mounted at the exhaust passage for sensing an air-fuel ratio.

15. An apparatus for detecting an excessive burn during a regeneration process, in which particulates accumulated in a particulate filter arranged in an exhaust passage of a diesel engine are burned and removed for regenerating the particulate filter, the apparatus comprising:
a sensor that measures an oxygen concentration in exhaust gas in the exhaust passage downstream of the particulate filter in predetermined time intervals after the regeneration process starts; and
a controller that determines whether the excessive burn occurs by determining whether the oxygen concentration measured by the sensor decreases with a predetermined tendency;
wherein the regeneration process is started by performing a post injection of unburned gas into the exhaust passage.

16. The apparatus according to claim 12, wherein the controller performs:
   determining that the regeneration process ends without the excessive burn when the followings are satisfied:
      the determining of whether the excessive burn occurs determines that the excessive burn does not occur; and
      the oxygen concentration measured by the measuring of the oxygen concentration is more than an oxygen concentration of a time, where the post injection is performed.

* * * * *